United States Patent
Johnson

[11] Patent Number: 5,360,184
[45] Date of Patent: Nov. 1, 1994

[54] HIGH-PERFORMANCE, LOW-COST INERTIAL GUIDANCE SYSTEM

[75] Inventor: William M. Johnson, Sudbury, Mass.

[73] Assignee: The Charles Stark Draper Laboratory, Inc., Cambridge, Mass.

[21] Appl. No.: 820,849

[22] Filed: Jan. 15, 1992

[51] Int. Cl.[5] .................... F41G 7/00; F42B 15/02
[52] U.S. Cl. ................................................ 244/3.2
[58] Field of Search .................. 244/3.2, 3.15, 79; 364/453

[56] References Cited

U.S. PATENT DOCUMENTS

| | | | |
|---|---|---|---|
| 3,746,281 | 7/1973 | Stripling | 244/3.2 |
| 3,924,824 | 12/1975 | Brodie et al. | 244/3.2 |
| 4,262,861 | 4/1981 | Goldstein | 244/3.2 |

Primary Examiner—Ian J. Lobo
Attorney, Agent, or Firm—Weingarten, Schurgin, Gagnebin & Hayes

[57] ABSTRACT

One or more strap-down star tracker modules and a strap-down gyro module cooperate to provide a high-performance and low-cost inertial guidance system especially well suited for ballistic missiles. The one or more star tracker modules include an alignment laser that cooperates with one or more gyro module autocollimation mirrors to measure three-axis bending and twist between the one or more strap-down star tracker modules and the strap-down gyro module. The one or more strap-down star tracker modules and the strap-down gyro module respectively determine inertial angle independently of one another. The strap-down gyro module is compensated for gyro drift whenever any difference remains between the inertial angle measured thereby and the same inertial angle measured by the one or more star tracker modules after isolating the contribution thereto of the measured three-axis bending and twist. Ring lasers are exemplary of the gyros of the strap-down gyro module, and an optical tracker that includes a beam expander/compressor telescope assembly and a high-bandwidth mosaic array sensor having a multi-spot tracking capability is exemplary of the one or more strap-down star tracker modules.

25 Claims, 3 Drawing Sheets

HIGH-PERFORMANCE, LOW-COST INERTIAL GUIDANCE SYSTEM

FIELD OF THE INVENTION

The instant invention is directed to the field of inertial guidance, and more particularly, to a novel high-performance and low-cost inertial guidance system.

BACKGROUND OF THE INVENTION

The use of gyros and accelerometers to provide inertial guidance of over-the-horizon and other deliverables, such as ballistic missiles, is a technique well-known to those skilled in the art. Typically, the gyros provide attitude information and the accelerometers provide, via multiple integration, position information. The attitude and position information enables on-board autopilots to calculate the position and velocity of the deliverables with respect to inertial space.

In order to secure the degree of precision-performance often required in ballistic missile and other applications, it has been necessary heretofore to gimbal and to float the gyro elements in such a way that they are neutrally buoyant with respect to the body of the deliverable and at rest with respect to inertial space. The complexity of the mechanisms deployed both to gimbal and to float the gyro elements not only have rendered them expensive to manufacture, but also has rendered them difficult to maintain and to fix. While ways have been sought to replace the expensive floating and gimballed gyro-based inertial guidance systems with strap-down gyros, because such strap-down gyro elements would themselves be subjected to large forces due to the accelerations of the deliverable to which they are strapped, which forces would produce position and other errors in gyro output, it has heretofore not been thought possible to provide high-permanence inertial guidance with comparatively low-cost and easy to maintain strap-down gyro elements.

SUMMARY OF THE INVENTION

It is accordingly the principal object of the present invention to provide a high-performance, low-cost inertial guidance system that is suitable to guide a deliverable to a target such as an over-the-horizon ballistic missile in a manner that achieves the same high performance levels as the heretofore known floated and gimballed gyro-based inertial guidance systems but with substantially reduced manufacturing costs as well as substantially reduced maintenance costs over the duration of their usable life. In accord therewith, strap-down gyros, such as ring lasers, are mounted to a platform subject to motion and acceleration forces. The strap-down gyro elements provide output signals representative of the attitude of the platform about three mutually orthogonal axes. From the output signals, together with accelerometer data, the inertial angle of the platform is readily calculable. The output signals of the strap-down gyros have error components that arise from the acceleration forces to which the platform is subjected which are attributable to the phenomenon of gyro drift.

In further accord therewith, a strap-down star tracker is mounted to the platform that provides an output signal representative of the same inertial angle of the platform.

In further accord therewith, controller means are disclosed responsive to the strap-down gyro's output signals and to the strap-down star tracker's output signal for compensating the strap-down gyros for gyro drift, including drift attributable to the acceleration forces to which the platform is subjected.

In the preferred embodiment, the strap-down gyros are mounted to a central, strength-providing bus portion of the platform, and the strap-down star tracker is mounted in position proximate the skin of the platform and remote from the strap-down star trackers. One or more strap-down star trackers may be employed.

In the preferred embodiment, the strap-down star tracker includes a high-bandwidth mosaic array sensor having a multi-spot tracking capability and a focal plane, a beam expander/compressor telescope optically coupled to the sensor for providing a sensible spot representative of a stellar body on the focal plane of the sensor, and an alignment laser optically coupled to the sensor.

The one or more strap-down star trackers and the strap-down gyros may move relatively to each other in bend and in twist due to the acceleration and other forces that act on the platform, and, in further accord with the instant invention, means are disclosed for measuring the relative motion in bend and in twist between the strap-down gyros and star tracker. In the preferred embodiment, the measuring means includes an autocollimation mirror mounted for motion with the strap-down gyros that cooperates with the alignment laser of the one or more strap-down star trackers to provide a sensible spot of optical energy in the focal plane of the sensor representative of the relative motion of the strap-down gyros and one or more star trackers.

BRIEF DESCRIPTION OF THE DRAWINGS

These and other objects, aspects and features of the present invention will become apparent as the invention becomes better understood by referring to the following solely-exemplary and non-limiting detailed description of the preferred embodiments thereof, and to the drawings, wherein.

DETAILED DESCRIPTION OF THE PREFERRED EMBODIMENTS

Figure 1:
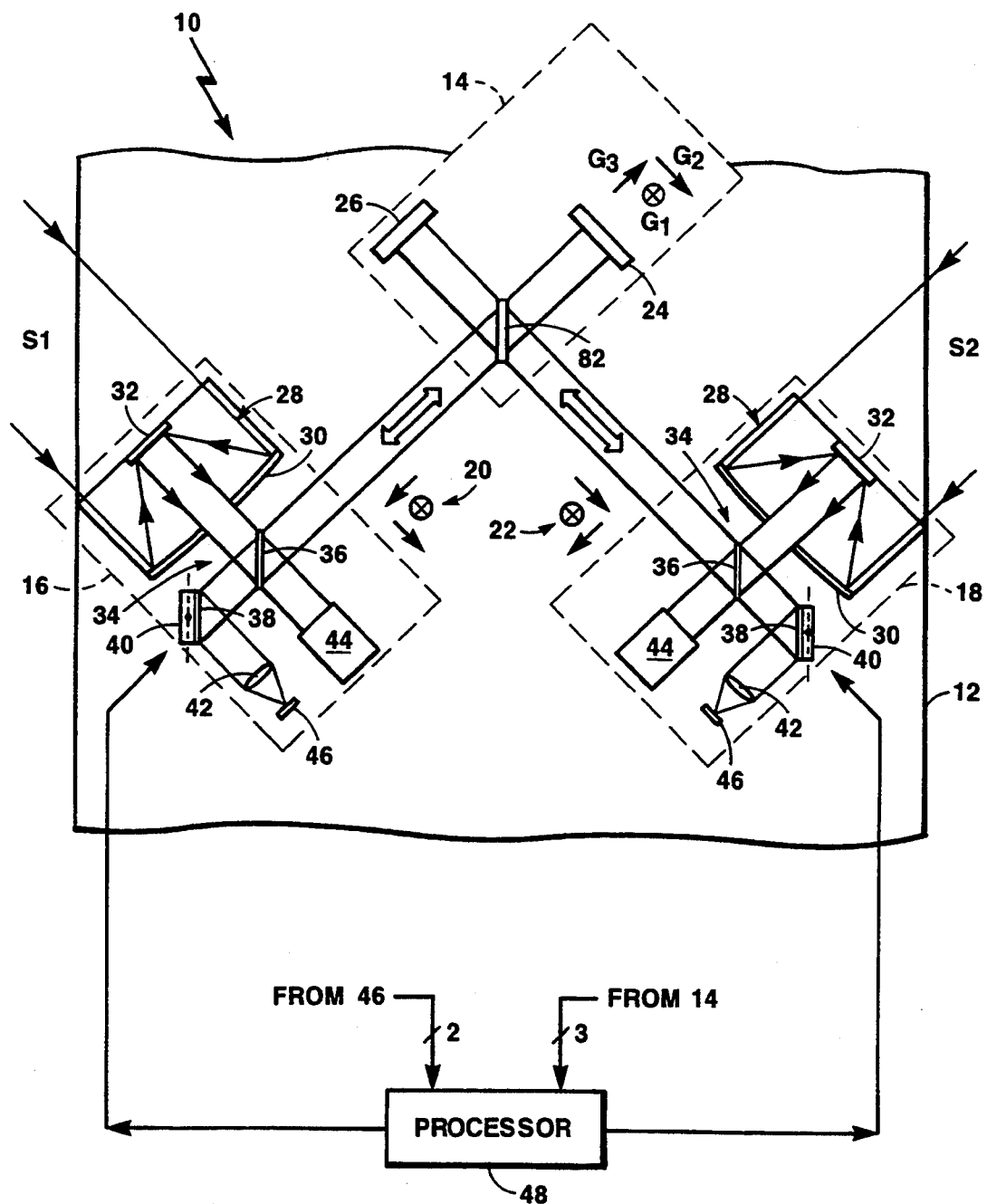
FIG. 1 is a schematic diagram illustrating the novel high-performance, low-cost inertial guidance system in accord with the present invention.

Referring now to FIG. 1, generally designated at 10 is a schematic diagram illustrating a high-performance, low-cost inertial guidance system constructed in accord with the present invention. A platform is schematically illustrated by partially broken box 12, which typically may be a ballistic missile. Although the principles of the invention are utilized in the preferred embodiment to provide high-performance, low-cost inertial guidance for ballistic missiles, other application areas include pointing/tracking systems, civil engineering alignment, mechanical instrumentation, aircraft flexure monitoring, automotive wheel alignment and laser alignment with multiple mirrors, among others.

A strap-down three-axis gyro module 14 is fixably mounted to the vehicle 12, preferably to a strength-member of the bus thereof, not shown. The three-axis strap-down gyro module 14 in the presently preferred embodiment includes three resonant ring laser gyroscopes mounted about three orthogonal axes and designated "G1, G2, G3". Other low-cost strap-down gyros, such as fiber optic gyros as well as conventional mechanical gyros used in a strap-down mode, may be employed as well without departing from the inventive concept.

First and second non-co-linear star tracker modules illustrated by dashed boxes 16, 18 are preferably mounted to the bus of the vehicle 12 proximate the skin thereof, preferably with their respective lines-of-sight defining an approximate right angle to each other, as illustrated. The star tracker modules 16 and 18 are each in spaced-apart confronting relation with the gyro module 14 and, due to the accelerations experienced by the vehicle 12, the strap-down gyro module 14 and the strap-down star tracker modules 16, 18 respectively undergo three-axes of bending and twist with respect to each other as shown by axes generally designated 20, 22. Autocollimating mirrors 24, 26 are fastened to the gyro module 14 the specular surfaces of which respectively confront the star tracker module 16 and the star tracker module 18.

The star tracker modules 16, 18 each include a beam expander/compressor telescope assembly generally designated 28. The beam expander/compressor telescope assembly 28 defines a field-of-view by means of a convex primary reflector 30 having a central aperture and a concave secondary reflector 32. Light gathered within its field-of-view is deviated through the central aperture thereof.

The beam compressor/expander telescope assembly 28 has a preselected magnification, M, as determined by the relative sizes of the members 30, 32. Changes in position in inertial space of objects within the field-of-view of the star tracker assemblies are magnified by the magnification factor of the beam compressor/expander telescope assemblies 28, enabling to provide more accurate inertial angle determinations in sensor space. In the preferred embodiment, a magnification factor of from two (2) to ten (10) is provided.

Optics generally designated 34 are provided to the back of the primary reflector 30 of the beam expander/compressor telescope assemblies 28. The optics 34 include beam splitters 36 co-axially aligned with the beam expander/compressor telescope assemblies 28, and mirrors 38 confronting respective ones of the beam splitters 36 and aligned with a corresponding one of the autocollimating mirrors 24, 26 of the low-cost strap-down gyro module 14. Two degree of freedom actuators 40 are mounted to the backs of the mirrors 38 of the strap-down modules 16, 18. Focusing lenses 42 are provided confronting the mirrors 38.

The optics 34 include one convex and one concave focusing lens, not shown, that cooperate to ensure that light energy deviated therethrough is collimated when it is focused by the lenses 42. The elements 36, 38 and 42, as well as the concave and convex focusing lenses, of the optics 34 are preferably provided as monolithic optical assemblies.

An alignment laser generally designated 44 is provided confronting the beam splitter 36 of the strap-down star tracker modules 16, 18. A mosaic array sensor 46 is provided confronting the lens 42 and mirror 38 and in the focal plane of the focusing lens 42.

The strap-down star tracker modules 16, 18 are preferably of the type described and claimed in allowed co-pending U.S. utility Pat. application Ser. No. 06/927,266, now abandoned entitled *BALLISTIC MISSILE BORESIGHT AND INERTIAL TRACKING SYSTEM AND METHOD*, of the same inventive entity and assignee as herein, incorporated herein by reference. The high-bandwidth mosaic array sensor 46 having a multiple-spot tracking capability preferably is of the type described and claimed in commonly-assigned U.S. Pat. No. 4,910,596 entitled *HIGH BANDWIDTH PLURAL SPOT VIDEO PROCESSOR*, incorporated herein by reference.

A processor 48 is coupled to the two (2) high-bandwidth mosaic-array sensors having a multiple-spot tracking capability 46, to the two (2) two degree of freedom actuators 40 and to the three gyro module output signals, one from each of low-cost gyro elements for each of three mutually-orthogonal axes, as illustrated. The output signals of accelerometers, not shown, are coupled to the processor 48.

Figure 2:
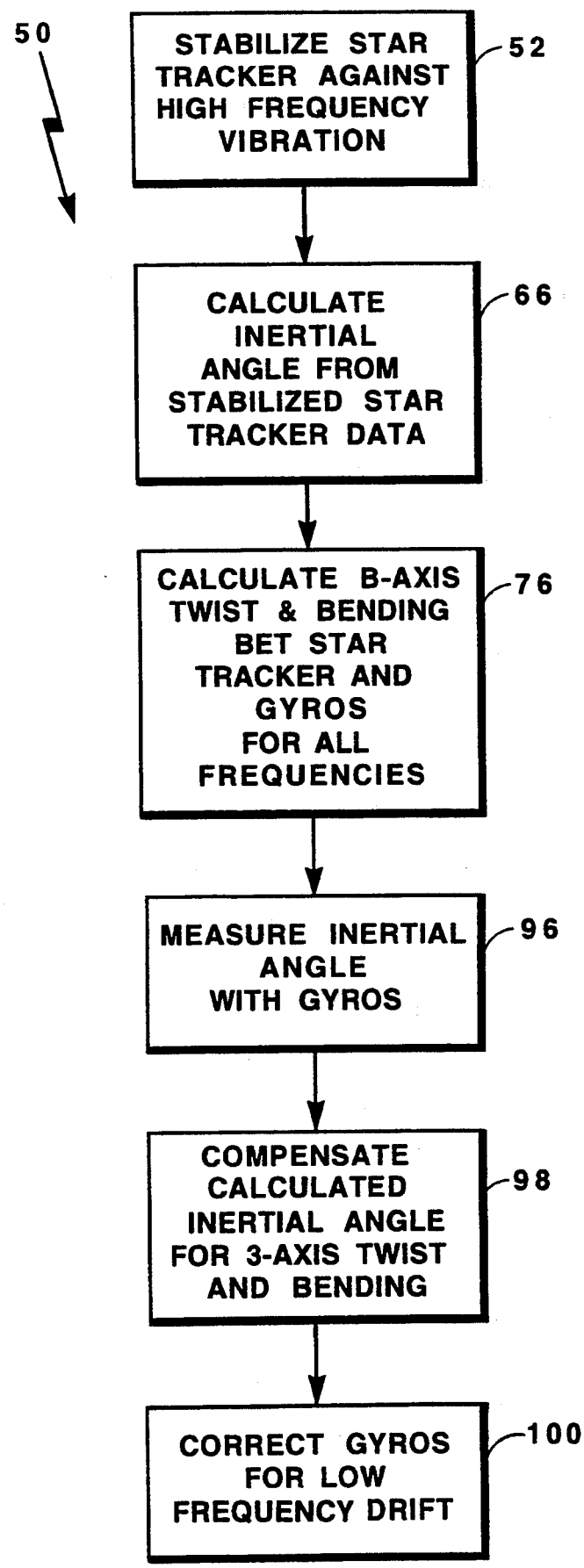
FIG. 2 is a block processing diagram illustrating the mode of operation of the high-performance, low-cost inertial guidance system in accord with the present invention.
Figure 3A:
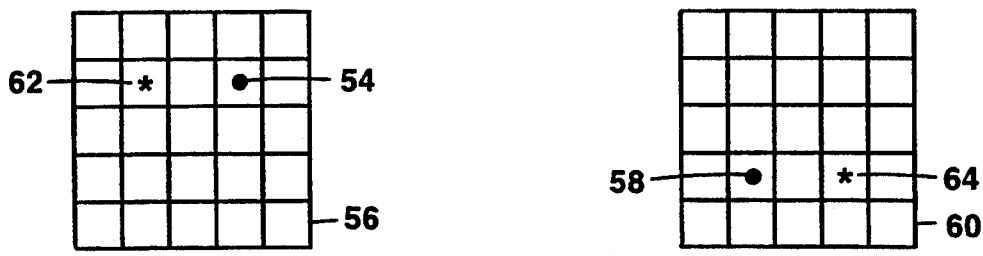
FIG. 3 illustrates in the FIGS. 3A–3C thereof sensor diagrams illustrating various control and data spots useful in explaining the operation of the high-performance, low-cost inertial guidance system in accord with the present invention.

Referring now to FIG. 2, generally designated at 50 is a block processing diagram illustrating the mode of operation of the high-performance, low-cost inertial guidance system in accord with the present invention. As shown by a block 52, the processor 48 (FIG. 1) is operative to stabilize the inertial tracker modules 16, 18 (FIG. 1) against high frequency local vibration due to vehicle motion and due to bus mechanical noise. The alignment lasers 44 (FIG. 1) thereof direct a collimated light beam off the respective beam splitters 36 (FIG. 1) thereof and onto respective ones of the autocollimating mirrors 24, 26 (FIG. 1) of the strap-down gyro module 14 (FIG. 1). The mirror 24 (FIG. 1), in turn, deviates it back along the reciprocal path and onto the mirror 38 (FIG. 1) of the star tracker module 16 (FIG. 1), while the mirror 26 (FIG. 1) deviates the corresponding alignment beam onto the mirror 38 (FIG. 1) of the star tracker module 18 (FIG. 1). The mirrors 38 (FIG. 1), in turn, deviate the respective alignment beams through corresponding lenses 42 (FIG. 1), that focus the same as autocollimating spots on the focal plane of the high-bandwidth mosaic array sensors 46 (FIG. 1) of the star tracker modules 16, 18 (FIG. 1) as shown in FIG. 3A by spot 54 on sensor 56 for the module 16 (FIG. 1) and by spot 58 on sensor 60 for the module 18 (FIG. 1).

The spots 54, 58 (FIG. 3) produced by the alignment lasers 44 (FIG. 1) of the respective strap-down star tracker modules 16, 18 (FIG. 1) have a preselected comparatively-high intensity, so that their position on the high-bandwidth, multiple-spot tracking arrays 56, 60 (FIG. 3) is able to be accurately monitored by the processor 48 (FIG. 1). The strap-down star tracker modules 16, 18 (FIG. 1) each sight comparatively-low intensity fixed stars designated "S1", "S2" within the field-of-view of the associated beam expander/compressor telescope assembly 28 (FIG. 1) thereof, and the optical energy respectively representative thereof is deviated off the corresponding beam splitter 36 (FIG. 1) onto the mirror 38 (FIG. 1) thereof, from whence it is imaged by the corresponding focusing lens 42 (FIG. 1) as a comparatively-low intensity spot of optical energy on respective mosaic array sensors of the strap-down star tracker modules 16, 18 (FIG. 1) as shown by spots 62, 64 on high-bandwidth multiple-spot tracking arrays 56, 60 in FIG. 3A.

The light of the comparatively-high intensity alignment beam spots 54, 58 (FIG. 3A) has traversed a common optical path through the respective optics 34 (FIG. 1) of the strap-down star tracker modules 16, 18 (FIG. 1) as that of the comparatively-low intensity star images 62, 64 onto the respective high-bandwidth sensors 56, 60 (FIG. 3), and is subject to the same high-frequency mechanical vibration disturbances. Because of their comparatively-high intensity, it becomes possible to accurately measure comparatively-high frequencies, which would be representative of high-bandwidth vehicle disturbances. The processor 48 (FIG. 1) responds to the comparatively-high frequency motion of the comparatively-bright alignment spots 54, 58 (FIG. 3) to drive the two degree of freedom actuators 40 (FIG. 1) mounted to the back of the mirrors 38 (FIG. 1) of the modules 16, 18 (FIG. 1) to stabilize the comparatively-low intensity spots 54, 58 against local motion. Local motion of the spots 54, 58 is representative of relative motion between the one or more tracker modules and the gyro module. Thereby, the comparatively-low intensity images of the fixed stars 62, 64 (FIG. 3) are stabilized against local motion of the strap-down star tracker modules 16, 18 (FIG. 1) that typically arises from high-frequency mechanical vibration on the vehicle.

Figure 3B:
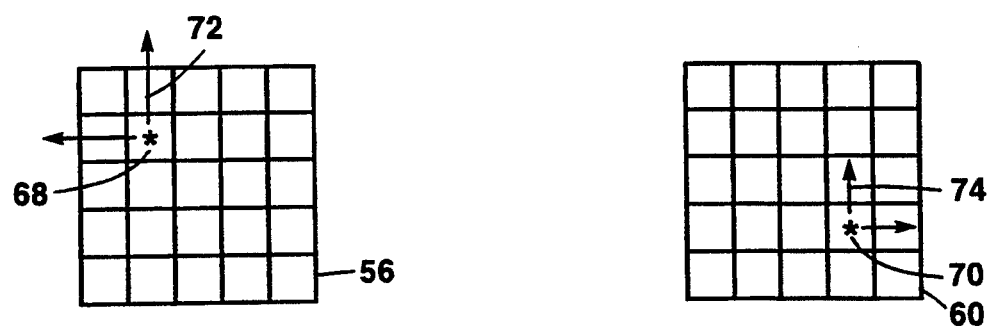

Returning now to FIG. 2, having stabilized the images of the fixed stars against high-frequency local vibration of the strap-down star tracker modules 16, 18, (FIG. 1) the processor 48 (FIG. 1) is operative to calculate the inertial angle of the vehicle 12 (FIG. 1) from the stabilized star tracker data as shown by block 66 of FIG. 2. As the vehicle 12 (FIG. 1) moves with respect to the fixed stars, the images of the fixed stars that are within the fields-of-view of the beam expander/compressor telescope assemblies move in a corresponding manner on the associated high-bandwidth mosaic array sensors having a multiple-spot tracking capability 46 (FIG. 1) of the strap-down star tracker modules 16, 18 of FIG. 1. The spot 68 in FIG. 3B on the sensor 56 is representative of the star "S1" sighted by the module 16 of the FIG. 1, and the spot 70 on the sensor 60 in FIG. 3B is representative of the star "S2" of the star tracker 18 of FIG. 1. As the vehicle 12 (FIG. 1) moves, the stabilized images 68, 70 (FIG. 3B) of the stars "S1, S2" (FIG. 1) sighted by the star tracker modules 16, 18 (FIG. 1) correspondingly move about on respective sensors 56, 60 (FIG. 3B) as illustrated in FIG. 3B respectively by arrows 72 and 74. The processor 48 (FIG. 1) is responsive to the motion 72 of the spot 68 to compute the inertial angle of the vehicle about two (2) axes with respect to inertial space and is responsive to the motion 74 of the spot 70 on the sensor 60 to compute the inertial angle of the vehicle 12 (FIG. 1) with respect to inertial space about another two (2) axes with respect to inertial space, the "two" two-axes inertial angle computations providing an additional star measurement that enables the processor 48 (FIG. 1) to compute the inertial angle of the vehicle 12 (FIG. 1) about the three mutually orthogonal axes of inertial space. Because the images 54, 56 have been stabilized against high-frequency mechanical vibration, the remaining motion of the images is relatively stable on the sensors enabling high signal-to-noise ratio measurement of spot position over comparatively-long signal integration times.

Figure 3C:
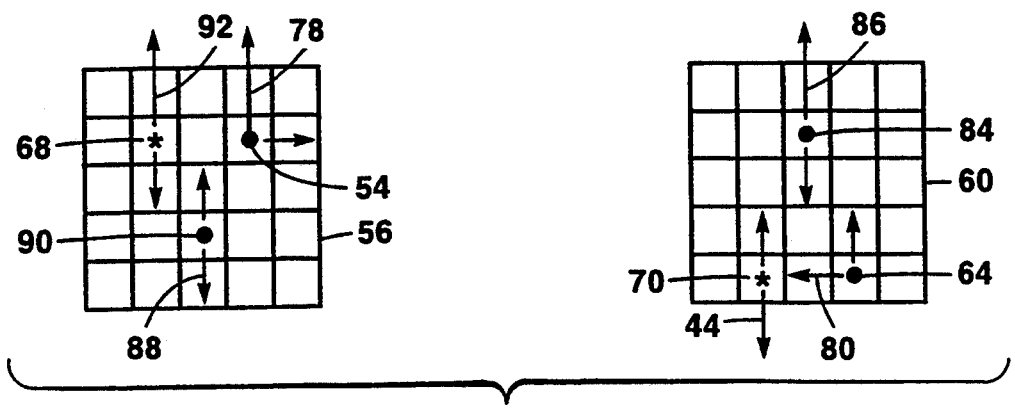

Returning now once again to FIG. 2, the processor 48 (FIG. 1) is operative to calculate over the range of applicable frequencies the three-axis twist and bending of each of the star tracker modules 16, 18 (FIG. 1) with respect to the strap-down gyro module 14 (FIG. 1) that arise from thermal and/or mechanical causes as shown by the block 76. The beam of the alignment laser 44 (FIG. 1) of the module 16 (FIG. 1) is deviated off the autocollimating mirror 24 (FIG. 1) through the optics 34 (FIG. 1) thereof producing spot 54 representative of the relative angle of the module 14 (FIG. 1) on the sensor 56 as shown in FIG. 3C, and the beam of the alignment laser 44 (FIG. 1) of the star tracker module 18 (FIG. 1) is deviated off the autocollimating mirror 26 (FIG. 1) through the associated optics 34 (FIG. 1) thereof producing spot 64 on the sensor 60 representative of the relative angle thereof, also as shown in FIG. 3C. As the modules 14, 16 (FIG. 1) bend about two axes relatively to each other, the spot 54 (FIG. 3C) is moved on the sensor 56 (FIG. 3C) in a manner corresponding to the two-axis bending as schematically illustrated in FIG. 3C by arrows 78; in like fashion, bending along two axes between the modules 14, 18 (FIG. 1) results in corresponding motion of the spot 64 (FIG. 3C) on the sensor 60 as schematically illustrated by arrows 80 in FIG. 3C.

The beam of the alignment laser 44 (FIG. 1) of the module 16 (FIG. 1) is deviated off the splitter 36 (FIG. 1) thereof and is incident to the mirror 24 (FIG. 1), which deviates it reciprocally back and onto splitter element 82 (FIG. 1), which is positioned confronting the mirrors 24 and 26 (FIG. 1), which splitter element 82 (FIG. 1) deviates it through the optics 34 (FIG. 1) of the star tracker module 18 (FIG. 1), which images it as a spot 84 on the sensor 60 as shown in FIG. 3C. As the star tracker module 16 (FIG. 1) rotates about the third remaining axis with respect to the strap-down gyro module 14 (FIG. 1), the spot 84 (FIG. 3C) is correspondingly moved on the sensor 60 as schematically illustrated in FIG. 3C by arrow 86.

In like fashion, the motion schematically illustrated by arrow 88 of spot 90 on the sensor 56 in FIG. 3C is representative of twisting motion of the strap-down gyro module 14 (FIG. 1) with respect to the strap-down star tracker module 18 (FIG. 1).

As the strap-down star tracker module 16 (FIG. 1) twists with respect to the strap-down gyro module 14 (FIG. 1), the spot 68 (FIG. 3C), representative of the star "S1" (FIG. 1) on the sensor 56 (FIG. 3C), moves correspondingly, as schematically illustrated by arrows 92 in FIG. 3C. If the corresponding gyro of the strap-down inertial reference module 14 (FIG. 1) indicates no corresponding high-frequency twist on the vehicle 12 (FIG. 1), then the resulting motion of the spot 68 (FIG. 3C) on the sensor 56 (FIG. 3C) is interpretated by the processor 48 (FIG. 1) as an indication of twist of the module 16 (FIG. 1) with respect to the module 14 (FIG. 1). Correspondingly, motion of spot 70 (FIG. 3C) corresponding to the star "S2" (FIG. 1) as schematically illustrated by arrows 94 in FIG. 3C on the sensor 60 (FIG. 3C), again in the absence of an output signal of the corresponding gyro of the module 14 (FIG. 1), is representative of twist of the module 18 (FIG. 1) with respect to the module 14 (FIG. 1).

Returning once more to FIG. 2, as shown by block 96, the processor is operative to determine the same inertial angle by means of the output signals of the gyroscopes G1, G2, G3 of the inertial module 14 (FIG. 1) as that determined in the step 66 by means of the one or more star tracker modules.

As shown by a block 98, the processor is operative to compensate the inertial angle calculated from the one or more star tracker modules for the three-axis twisting and bending between the modules 16, 18 (FIG. 1) and the module 14 (FIG. 1) as calculated by the block 76.

As shown by a block 100, any difference that remains between the inertial angle calculated by the one or more star tracker modules and the inertial angle measured by the gyro's output signals after the three-axis bending and twist has been isolated and compensated is representative of three-axis gyro drift, and the processor is operative to correct the gyros for comparatively-low frequency drift.

Many modifications, changes and additions of the presently disclosed invention will become apparent to those skilled in the art having benefitted from the instant disclosure. For example, a single star tracker may, in conjunction with a vehicle maneuver to bring the same star tracker to another, non-co-linear orientation, provide the star data to enable the processor to calculate the inertial angle measurement of the vehicle with respect to the three axes of inertial space.

What is claimed is:

1. An inertial guidance system that is suitable for a platform subject to acceleration forces, comprising:
    a strap-down gyro module mountable to the platform for providing output signals representative of the inertial angle of the platform about three mutually orthogonal axes, the output signals of the strap-down gyro module having an error component that arises from the acceleration forces to which the platform is subjected, which error components are attributable to the phenomenon of gyro drift;
    a strap-down tracker module mountable to the platform for providing an output signal representative of the inertial angle of the platform with respect to inertial space; and
    controller means responsive to the output signals of the strap-down gyro module and to the output signal of the strap-down tracker module for compensating the output signal strap-down gyro module representative of the platform inertial angle for the error component thereof that arises from the platform acceleration forces that are attributable to the phenomenon of gyro drift.

2. The invention of claim 1, wherein said strap-down gyro module and said strap-down tracker module are relatively movable in bend and in twist with respect to each other, further including means for providing signals representative of the degree of relative motion therebetween in bend and in twist, and wherein said controller means is further responsive to said signals representative of said degree of relative motion for compensating the strap-down gyro module's output signals for gyro drift.

3. The invention of claim 2, wherein the strap-down tracker module includes a high-bandwidth mosaic array sensor having a multi-spot tracking capability and a focal plane, and a beam expander/compressor telescope assembly having a field-of-view optically coupled to the sensor for providing a sensible spot representative of a body within the field-of-view on the focal plane of the sensor.

4. The invention of claim 3, wherein the platform is a ballistic missile, the strap-down gyro module is mountable to a bus portion of the platform in a central, strength-providing portion thereof, and the strap-down tracker module is mounted to the platform in position proximate the skin of the platform and remote from the strap-down gyro module.

5. The invention of claim 3, further including an autocollimating mirror mounted for motion with the strap-down gyro module, wherein the beam expander/compressor telescope assembly further includes an alignment laser optically coupled to the sensor and cooperative with the autocollimating mirror mounted for motion with the strap-down gyro module for providing a sensible spot of optical energy in the focal plane of the sensor representative of the relative angular position of the strap-down gyro module; and further including means responsive to the sensible spots respectively representative of the body and of the relative angular position of the strap-down gyro module on the high-bandwidth sensor having a multi-spot tracking capability for determining twisting and bending motion about three orthogonal axes defined between the strap-down tracker module and the strap-down gyro module.

6. The invention of claim 5, further including means for compensating the sensible spots for local sensor vibration induced spot motion.

7. The invention of claim 5, wherein the strap-down gyro module includes ring laser gyros.

8. The invention of claim 5, wherein the strap-down gyro module includes fiber optic gyros.

9. The invention of claim 5, wherein the strap-down gyro module includes strapped-down mechanical gyros.

10. The invention of claim 3, wherein the body is a stellar body.

11. An inertial guidance system, comprising:
    a gyro module having a plurality of gyro elements that provide gyro output signals about three mutually orthogonal axes;
    a first star tracker mociule having a first field-of-view in confronting relation with and defining a first orientation to the gyro module that provides a first signal representative of inertial angle of an object sighted within the first field-of-view;
    a first autocollimator cooperative with the gyro module and with the first star tracker module that provides a first autocollimator signal representative of relative motion between the gyro module and the first star tracker module;
    a second star tracker module having a second field-of-view in confronting relation with and defining a second orientation different from the first orientation to the gyro module that provides a second signal representative of inertial angle of an object sighted within the second field-of-view;
    a second autocollimator cooperative with the gyro module and with the second star tracker module that provides a second autocollimator signal representative of relative motion between the gyro module and the second star tracker module; and
    a controller responsive to said gyro output signals, to said first and second signals, and to said first and second autocollimator signals for isolating relative motion respectively between the first and second star tracker modules and the gyro module in such a way that the first and second signals on the one hand and the gyro output signals on the other hand should be measuring the same inertial angle and for compensating the gyro output signals for gyro drift for any difference therebetween.

12. The invention of claim 11, wherein said first and second star trackers include high-bandwidth mosaic array sensors each having a multi-spot tracking capability and a focal plane, and optical means for focusing objects sighted within the first and second fields-of-view on respective high-bandwidth mosaic array sensors as sensible spots in the focal planes thereof.

13. The invention of claim 12, wherein said optical means further includes a beam expander/compressor telescope assembly.

14. The invention of claim 12, wherein said first and second autocollimators respectively include first and second mirrors confronting said first and second star tracker modules, first and second alignment lasers respectively cooperative with the first and second mirrors for providing said first and second autocollimator signals in the form of sensible spots on the focal plane of said high-bandwidth mosaic array sensors having multi-spot tracking capabilities.

15. The invention of claim 11, wherein said first and second different orientations are non-co-linear orientations.

16. The invention of claim 11, wherein said gyro elements are each a ring laser gyro.

17. The invention of claim 11, wherein the gyro elements are each fiber optic gyros.

18. The invention of claim 11, wherein the gyro elements are each strapped-down mechanical gyros.

19. An inertial guidance system, comprising:
gyro means for providing gyro output signals about three mutually orthogonal axes representative of measured inertial angle;
tracker means for providing a signal representative of the same inertial angle independently of the gyro means;
autocollimator means for Droviding an autocollimator signal representative of relative motion between the gyro means and the tracker means; and
controller means responsive to the gyro output signals, to the tracker signal, and to the autocollimator signal for isolating relative motion between the gyro means and the tracker means in such a way that the gyro signal and the tracker signal should be measuring the same inertial angle, and for compensating the gyro output signal for drift for any difference therebetween.

20. The invention of claim 19, wherein said gyro means are strap-down gyros.

21. The invention of claim 19, wherein said tracker means includes a high-bandwidth mosaic array sensor having a multi-spot tracking capability.

22. The invention of claim 19, wherein said autocollimator means includes an alignment laser, and an autocollimating mirror mounted for motion with the gyro means.

23. The invention of claim 19, wherein said tracker means includes first and second non-co-linear star tracker modules.

24. The invention of claim 23, wherein said first and second star tracker modules each include a beam expander/compressor telescope assembly.

25. The invention of claim 19, wherein said tracker means produce said tracker output signal at first and second non-co-linear orientations of the tracker means with respect to inertial space.

* * * * *

UNITED STATES PATENT AND TRADEMARK OFFICE
CERTIFICATE OF CORRECTION

PATENT NO. : 5,360,184
DATED : November 1, 1994
INVENTOR(S) : William M. Johnson It is certified that error appears in the above-indentified patent and that said Letters Patent is hereby corrected as shown below:

Column 8, line 36, "tracker mociule" should read --tracker module--.

Column 10, line 4, "Droviding" should read --providing--.

Signed and Sealed this

Eighteenth Day of April, 1995

Attest:

BRUCE LEHMAN

Attesting Officer

Commissioner of Patents and Trademarks